United States Patent [19]
Makino

[11] Patent Number: 5,495,559
[45] Date of Patent: Feb. 27, 1996

[54] NON-VOLATILE MEMORY DATA INITIALIZATION/REWRITE APPARATUS FOR A PRINTER

[75] Inventor: Kyoko Makino, Shizuoka, Japan

[73] Assignee: Star Micronics Co., Ltd., Shizuoka, Japan

[21] Appl. No.: 188,788

[22] Filed: Jan. 31, 1994

[30] Foreign Application Priority Data

Feb. 1, 1993 [JP] Japan ................... 5-036154

[51] Int. Cl.⁶ .................................. G06K 15/00
[52] U.S. Cl. .......................... 395/112; 395/114
[58] Field of Search .................. 395/114, 112, 395/115; 364/519; 400/54

[56] References Cited

U.S. PATENT DOCUMENTS

| | | | |
|---|---|---|---|
| 5,050,098 | 9/1991 | Brown, III et al. | 395/112 |
| 5,131,078 | 7/1992 | Ikenoue | 395/114 |
| 5,133,610 | 7/1992 | Sukigara | 395/112 |
| 5,268,993 | 12/1993 | Ikenoue et al. | 395/114 |
| 5,295,233 | 3/1994 | Ota | 395/115 |

FOREIGN PATENT DOCUMENTS

| | | | |
|---|---|---|---|
| 63-209967 | 8/1988 | Japan | B41J 29/38 |
| 3140279 | 6/1991 | Japan | B41J 29/38 |
| 4133782 | 5/1992 | Japan | B41J 29/38 |

*Primary Examiner*—Raymond J. Bayerl
*Assistant Examiner*—Steven P. Sax
*Attorney, Agent, or Firm*—Whitham, Curtis, Whitham & McGinn

[57] ABSTRACT

Disclosed is a printer which will carry out initialization or rewriting of data in a non-volatile memory in response to a control command sent from a host machine, and execute printer initialization, based on the initialized or rewritten data, by a control command sent from the host machine. Unlike the prior arts, therefore, it is possible to perform initialization of the printer based on the initialized or rewritten data, without involving a troublesome switching operation and without requiring an operation of powering off and then on the printer or resetting the host machine. A printer according to another aspect of this invention is designed to print out data in the non-volatile memory in response to a control command sent from the host machine. It is therefore possible to print out the contents of the non-volatile memory for confirmation without involving a troublesome switching operation in this case too. Further, if the structure of the second aspect is added to the structure of the first aspect, it is possible to easily check if the data in the non-volatile memory has been surely initialized or has been correctly rewritten.

11 Claims, 7 Drawing Sheets

FIG. 1

| | COMMANDS | CONTENTS |
|---|---|---|
| ① | ESC SUB 09H | ENTER EEPROM CONTROL MODE AND DISREGARD OTHER COMMANDS THAN FOUR COMMANDS ② TO ⑤ |
| ② | ESC @ | INITIALIZE PRINT BUFFER AND WORK AREA OF PRINTER AND LEAVE EEPROM CONTROL MODE |
| ③ | ESC M @ | INITIALIZE EEPROM (RETURN TO FACTORY SETTING) |
| ④ | ESC M W n<br>n = 1, 0 | n = 0   WRITE 128 BYTES IN EEPROM<br>n = 1   WRITE 1 BYTE IN EEPROM |
| ⑤ | ESC M R | PRINT OUT DATA IN EEPROM IN HEXADECIMAL FORM AT HIGH SPEED |

NON-VOLATILE MEMORY DATA INITIALIZATION/REWRITE APPARATUS FOR A PRINTER

BACKGROUND OF THE INVENTION

1. Field of the Invention

The present invention relates to a printer having a function to control a non-volatile memory, and, more particularly, to a printer, which will perform initialization and rewriting of data stored in a non-volatile memory, the initialization of the printer, and printing of the data stored in the non-volatile memory in response to a control command from a host machine, such as a host computer, without involving a troublesome switching operation or requiring sequential discrimination of many control commands.

2. Description of the Related Art

Generally, printers are designed in such a way that they are automatically set with various initial values immediately after being powered on and start functioning in accordance with the initial values. The initial values are stored in a non-volatile memory, such as EEPROM (Electrically Erasable Programmable Read Only Memory), so that they will remain retained when powered off. To rewrite the initial values stored in the EEPROM, switches on an operation panel should normally be operated. Some of the initial values can be rewritten temporarily on a RAM (Random Access Memory), while retained in the EEPROM, by a control command from a host computer or the like.

There is a printer which is so designed as to rewrite the initial values stored in its EEPROM, not temporarily, by a control command sent from a host machine. Such a printer is disclosed in, for example, Japanese Unexamined Patent Publication No. sho 63-209967. The disclosed printer discriminates first initial data change command from other commands sent from the host machine. If the initial data change command is discriminated, the printer receives an address in the EEPROM specified as a parameter. Then, the printer receives change data and writes that data in the EEPROM at the already received address. With the contents of the EEPROM altered, when the printer is powered off and then powered on again, or the host machine is reset, a reset signal (INPUT PRIME signal) will be input via an interface cable to the printer, forcibly returning the control program of the printer to the initial flow, and the CPU will initialize individual sections of the printer according to the altered contents of the EEPROM.

A printer with another structure is disclosed in Japanese Unexamined Patent Publication No. hei 4-133782. In this case, a transmit-receive device is connected to an external interface section, and a message from a master control section is displayed on a display section of this device. Reading that message, a user uses a keyboard or the like to enter data. The entered data will be transferred to the master control section via the external interface section, and the master control section will rewrite the settings of a memory switch section based on the transferred data.

The above-described conventional structures raise the following shortcomings. First, the system of rewriting the contents of the EEPROM through the operation of switches on the operation panel involves a troublesome switching operation and prevents easy rewriting. In addition, when many printers are used, such a bothersome work should be performed individually. The system disclosed in Japanese Unexamined Patent Publication No. sho 63-209967 is advantageous over the first one in that rewriting can be accomplished by using a control command from a host machine, so that with the use of many printers, data in the EEPROMs in those printers can be collectively rewritten by some operation from the host machine side. There are, however, generally multifarious printing conditions that are to be stored in a non-volatile memory, so numerous control commands prepared for the conditions should be discriminated sequentially, which would take time to rewrite the contents of the EEPROM. This problem will be discussed below more specifically. In the case of Japanese Unexamined Patent Publication No. sho 63-209967, the printer receives an address and data to be written at that address, and writes the data at the specified address in the non-volatile memory. That is, a single command will rewrite just one address, so changing a plurality of conditions (e.g., setting various conditions) requires a command to be sent for each address (each condition). This takes much time.

In the case of the method described in Japanese Unexamined Patent Publication No. hei 4-133782, it is necessary to operate an input section, such as a keyboard, so that a tedious work is inevitable.

In either prior art system, to perform printer initialization based on the rewritten contents of the EEPROM, the printer should be powered off and then powered on again, or the host machine should be reset, which still involves a troublesome operation. Further, to print out data in the EEPROM to check if the data in the EEPROM has been rewritten properly, the user should perform a troublesome switching operation.

SUMMARY OF THE INVENTION

It is therefore an object of the present invention to provide a printer which will quickly perform control on a non-volatile memory, such as initialization and rewriting of data stored in that memory, initialization of the printer, and printing of the data stored in the memory, without involving a troublesome switching operation.

To achieve this object, according to one aspect of the present invention, there is provided a printer which comprises non-volatile memory data initialization/rewrite command discriminating means for discriminating a control command relating to initialization or rewriting of data in a non-volatile memory from others sent from a host machine; non-volatile memory data initializing/rewriting means for initializing or rewriting the data in the non-volatile memory when the non-volatile memory data initialization/rewrite command discriminating means has discriminated the control command relating to initialization or rewriting of the data in the non-volatile memory; printer initialization command discriminating means for discriminating a control command relating to initialization of the printer from others sent from the host machine; and printer initializing means for performing printer initialization based on initialized or rewritten data in the non-volatile memory when the printer initialization command discriminating means has discriminated the control command relating to initialization of the printer.

The printer initialization command discriminating means may be designed to discriminate the control command relating to initialization of the printer, after data initialization or rewriting is executed by the non-volatile memory data initializing/rewriting means.

Further, the non-volatile memory data initializing/rewriting means may partially or collectively rewrite the data in the non-volatile memory.

The non-volatile memory data initialization/rewrite command discriminating means and the non-volatile memory data initializing/rewriting means may be designed to discriminate the control command relating to initialization of the data in the non-volatile memory and perform predetermined initialization when necessary, and discriminate the control command relating to rewriting of the data in the non-volatile memory and perform specified rewriting when necessary.

The printer may be designed in such a way that after printer initialization by the printer initializing means is completed, the printer automatically returns to a state immediately after power on.

With the above structure, initialization or rewriting of data in the non-volatile memory will be carried out by a control command sent from the host machine, and printer initialization will be executed successively, based on the initialized or rewritten data, by a control command sent from the host machine. Unlike the prior art, therefore, it is possible to perform initialization of the printer based on the initialized or rewritten data, without involving a troublesome switching operation and without requiring an operation of powering off and then on the printer, or resetting the host machine.

According to another aspect of this invention, there is provided a printer which comprises non-volatile memory data print command discriminating means for discriminating a control command relating to printing of data in a non-volatile memory; and non-volatile memory data printing means for printing the data in the non-volatile memory when the non-volatile memory data print command discriminating means has discriminated the control command relating to printing of the data in the non-volatile memory.

The non-volatile memory data print command discriminating means and the non-volatile memory data printing means may be designed to function when the printer enters a mode to initialize or rewrite the data in the non-volatile memory.

The non-volatile memory data print command discriminating means and the non-volatile memory data printing means may be designed to function in normal control mode different from a mode to initialize or rewrite the data in the non-volatile memory.

This printer is designed to print out data in the non-volatile memory in response to a control command sent from the host machine. It is therefore possible to print out the contents of the non-volatile memory for confirmation without involving a troublesome switching operation in this case too. Further, if the structure of the second aspect is added to the structure of the first aspect, it is possible to easily check if the data in the non-volatile memory has been surely initialized or has been correctly rewritten.

DETAILED DESCRIPTION OF THE PREFERRED EMBODIMENTS

A first embodiment of the present invention will now be described referring to FIGS. 1 through 4. To begin with, a description will be given of the structure of a control section of a printer according to this embodiment. As shown in the block diagram of FIG. 1, the control section includes a CPU (Central Processing Unit) 1 and a ROM (Read Only Memory) 3. The ROM 3 stores an EEPROM control program 3a for controlling an EEPROM 5 as a non-volatile memory, control commands 3b, a print format table 3c, and factory default initial data 3d. The EEPROM control program 3a includes a control program for controlling the EEPROM 5 as a non-volatile memory. The control commands 3b include various control commands which will be valid by priority or exclusively when the printer has entered an EEPROM control mode.

Figure 1:
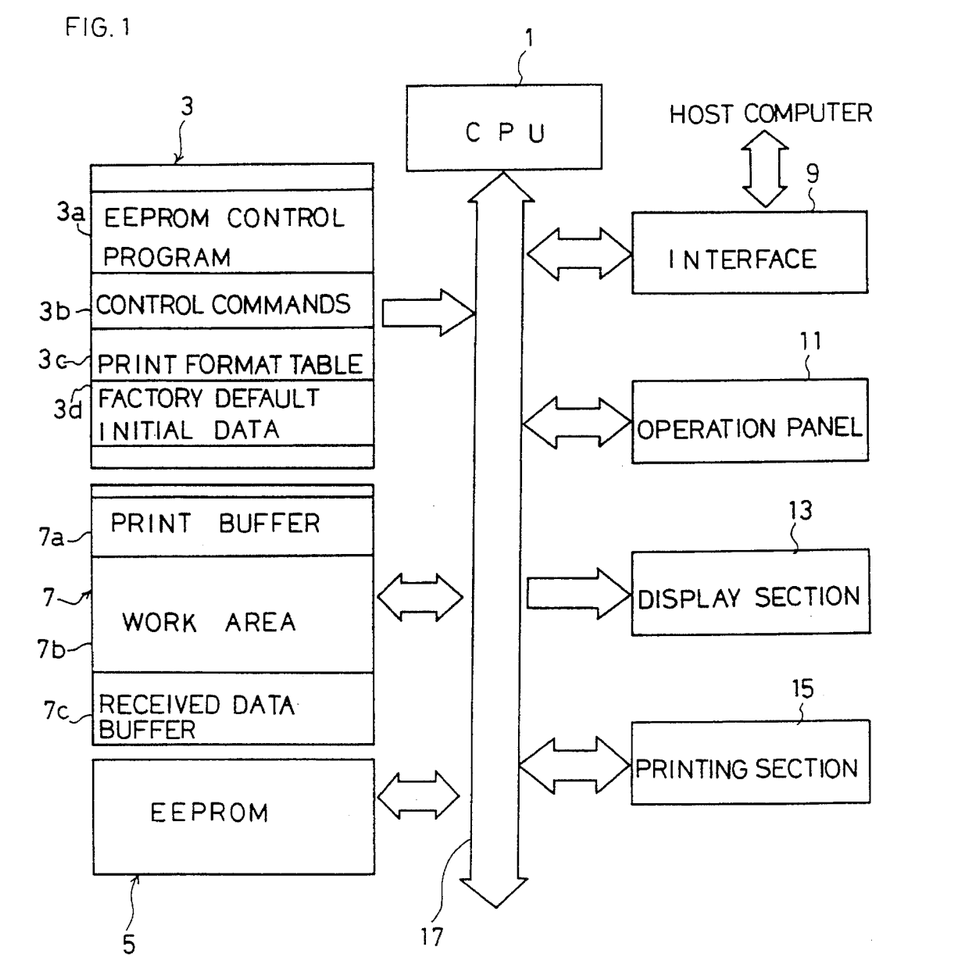
FIG. 1 is a block diagram illustrating the structure of a control section of a printer according to a first embodiment of the present invention.

The control section also includes a RAM 7, which has a print buffer 7a for storing data to be printed by a printing head, a work area 7b for storing initial values read from the EEPROM 5, and a received data buffer 7c for storing received data sent via an interface 9 from a host machine (not shown). The interface 9 serves to accomplish data exchange between the host machine and the CPU 1. Further provided is an operation panel 11 which has switches for inputting various kinds of data to the CPU 1. The control section also has a display section 13 providing various indicators, such as LED indicators. What is specified by the operation of the switches or the like on operation panel 11 will be indicated by those indicators. A printing section 15 is further provided to print out data in the EEPROM 5 or the like in the format based on the print format table 3c. Reference numeral "17" denotes a bus which connects the CPU 1 to the other described components.

Figure 2:
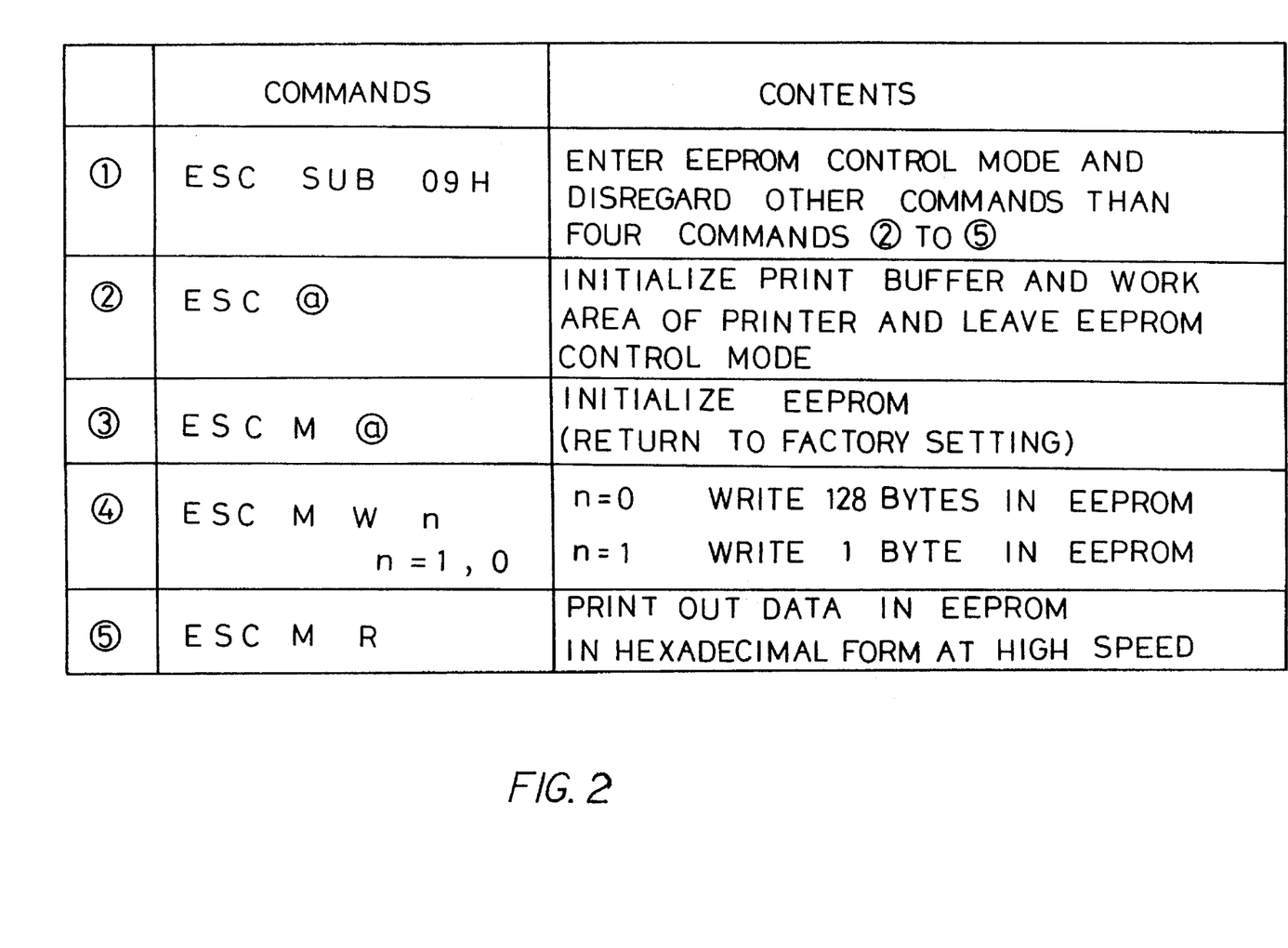
FIG. 2 is a diagram showing the contents of control commands according to the first embodiment.

The control commands 3b stored in the ROM 3 will now be described. Of those control commands 3b, a control command to enter the EEPROM control mode and four control commands which become valid only in the EEPROM control mode are illustrated in FIG. 2. Of the five control commands shown in FIG. 2, "ESC SUB 09H" is the control command to enter the EEPROM control mode, and "ESC @," "ESC M @," "ESC M W n" (n=1, 0) and "ESC M R" are the four control commands which become valid only in EEPROM control mode. Those commands will be described below one by one.

First, the control command "ESC SUB 09H" instructs the printer to enter the EEPROM control mode and disregard other control commands than the above four control commands "ESC @," "ESC M @," "ESC M W n" (n=1, 0) and "ESC M R." The control command "ESC @" sets various settings of the printer to initial values supposed to be effective immediately after power on (printer initialization). In the EEPROM control mode, this command forces the printer to leave the EEPROM control mode after printer initialization. If this control command "ESC @" is executed after execution of the control command "ESC M W n" (n=1, 0), for example, the new contents of the EEPROM 5 which have been rewritten by the control command "ESC M W n" (n=1, 0) will be transferred to the work area 7b and any remaining data in the print buffer 7a will be cleared. In other words, the execution of the control command "ESC @" accomplishes the initialization of the printer based on the new memory contents without powering off and then on the printer, or resetting the host machine, which has been needed by the prior art.

The control command "ESC M @" instructs the printer to initialize the EEPROM 5 (i.e., to return the contents of the EEPROM 5 to the factory default setting).

Figure 4:
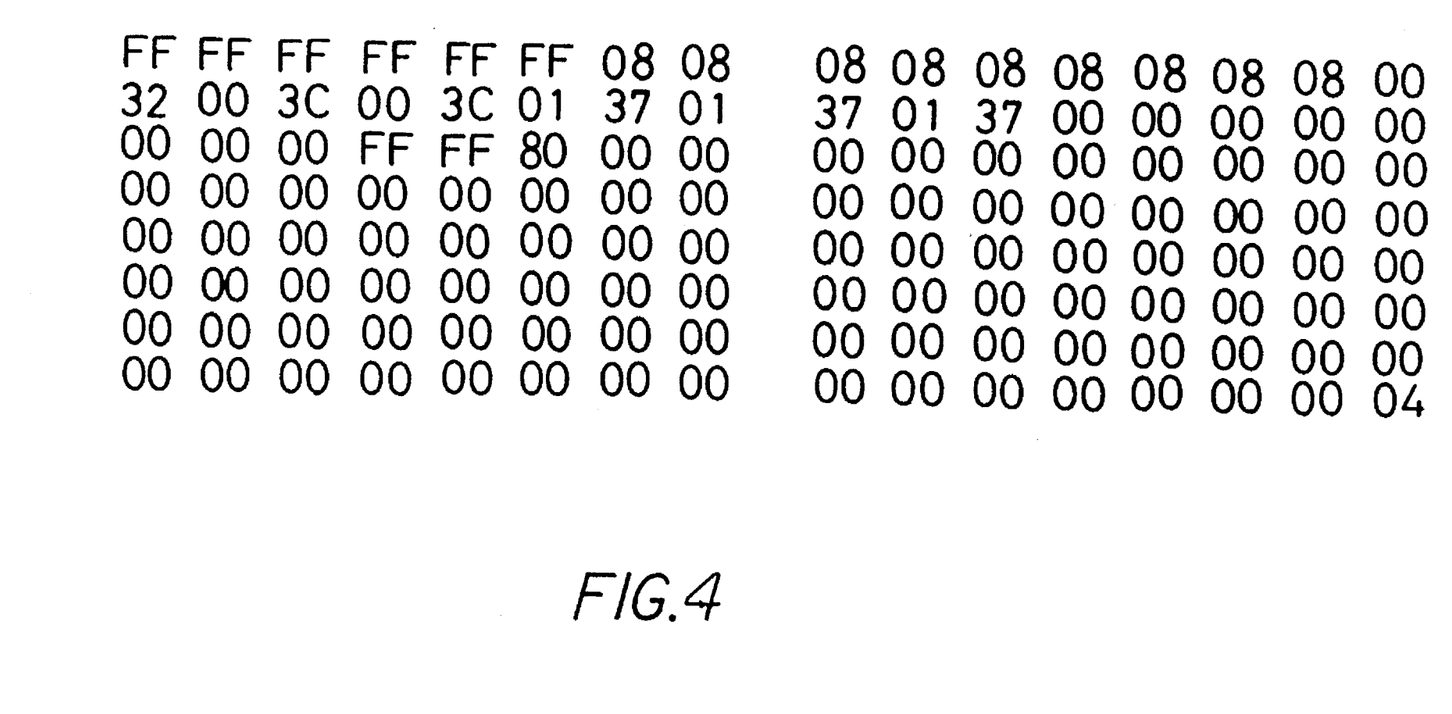
FIG. 4 is a diagram showing the printout of the contents of an EEPROM in hexadecimal notation according to the first embodiment.

The control command "ESC M W n" (n=1, 0) performs two different functions depending on the value of n. When n is "0," data of 128 bytes will be transferred following the "n" and those pieces of data will all be written in the EEPROM 5. When n is "1," on the other hand, 2-byte data will be transferred following the "n"; the first byte of that data indicates an address in the EEPROM 5 while the second byte indicates what is to be written. The data of the second byte will be written at the address specified by the first byte. In other words, all the data in the EEPROM 5 is rewritten collectively when n is "0," while only a part of the data in the EEPROM 5 is rewritten when n is "1," and either rewriting is selectable. The control command "ESC M R" instructs the printer to print out all the data in the EEPROM 5 at a high speed in a hexadecimal form as shown in FIG. 4.

Figure 3A:
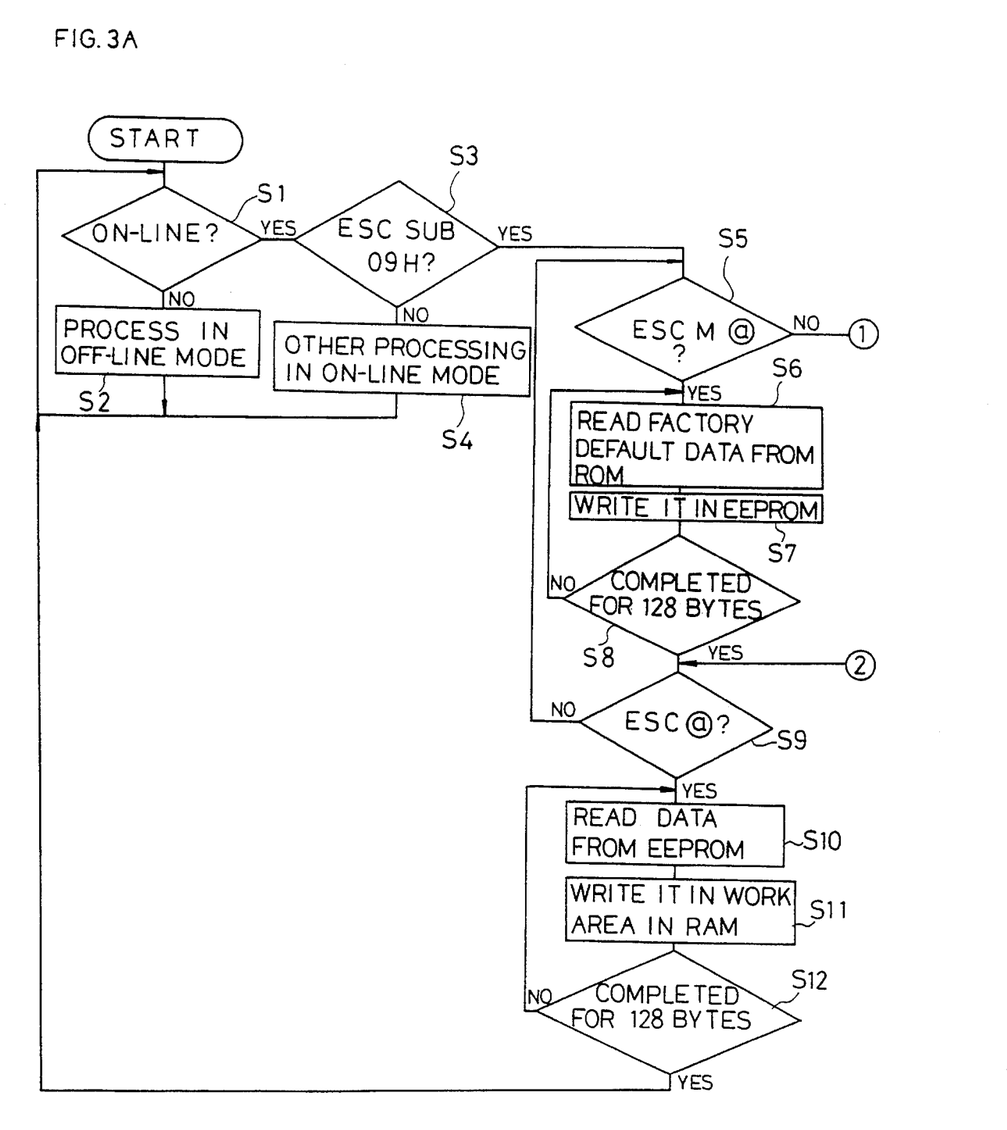
FIG. 3A and FIG. 3B are a flowchart for explaining the operation of the first embodiment.
Figure 3B:
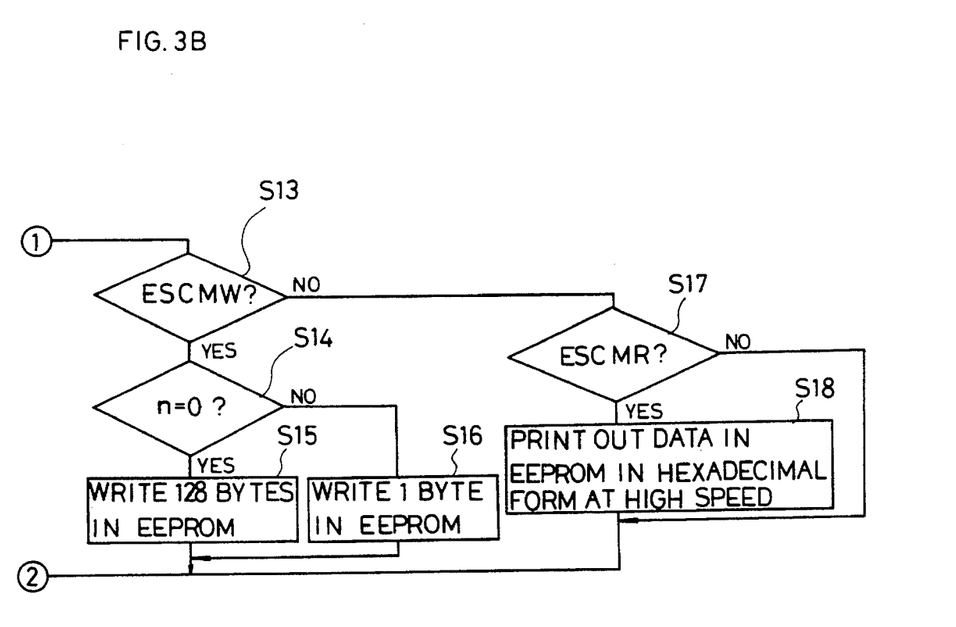

The operation of the printer with the above-described structure will be discussed below referring to the flowchart given in FIG. 3A and FIG. 3B. FIG. 3A and FIG. 3B illustrate a sequence of processes following the initialization process at the time of power on, and the printer is set on-line at "START." First, the status of an on-line/off-line mode switch (on the operation panel) is checked (step S1). When this switch is operated, the printer enters "off-line" and the flow proceeds to step S2 to perform a process associated with the off-line mode before returning to step S1 again. When the on-line/off-line mode switch is not operated, on the other hand, the flow proceeds to step S3 to discriminate the control command "ESC SUB 09H" to enter the EEPROM control mode from received data. If the received control command is not this control command "ESC SUB 09H," the flow advances to step S4 to carry out the other processing in the on-line mode before returning to step S1 again.

When the received data is the control command "ESC SUB 09H" to enter the EEPROM control mode, the flow goes to step S5 for discriminating the control command "ESC M @" which instructs the printer to initialize the EEPROM 5 (i.e., to return the contents of the EEPROM 5 to the factory default setting). When "ESC M @" is received, the flow proceeds to step S6 to read the factory default initial data 3d from the ROM 3, and then writes that data in the EEPROM 5 (step S7). The above sequence of processes is repeated byte by byte until the processing is completed for 128 bytes (step S8).

If the processing is completed for 128 bytes, the flow goes to step S9 to discriminate the control command "ESC @" to leave the EEPROM control mode. When the received control command is not this command "ESC @," the flow returns to step S5. When "ESC @" is received, on the other hand, the data in the EEPROM 5 is read out (step S10) and is then written in the work area 7b in the RAM 7 (step S11). This task is repeated byte by byte until the processing is completed for 128 bytes (step S12). If the processing is completed for 128 bytes, the flow returns to step S1, which completes the initialization of the printer.

If the control command "ESC M @" is not received in step S5, the flow proceeds to step 13 to discriminate the control command "ESC M W n" (n=0, 1) for rewriting the contents of the EEPROM 5. If the control command "ESC M W n" (n=0, 1) is discriminated, the flow proceeds to step S14 to discriminate the value of "n." When n is "0," the flow goes to step S15 where 128-byte data, transferred following the control command "ESC M W 0" and stored in the received data buffer 7a of the RAM 7, are collectively rewritten in the EEPROM 5. When n is "1," on the other hand, the flow goes to step S16 where based on 2-byte data following the control command "ESC M W 1," one byte of data is written at an address specified by the other byte, in the EEPROM 5. Then, the flow proceeds to step S9 to execute the already-explained sequence of processes. In this case, with all or part of the contents of the EEPROM 5 rewritten, the printer initialization is performed accordingly and the EEPROM control mode is canceled.

If the control command "ESC M W n" is not received in step S13, the flow advances to step S17 to discriminate the command "ESC M R" which starts high-speed printing of the data in the EEPROM 5 in a hexadecimal form. When the control command "ESC M R" is discriminated, the data in the EEPROM 5 is printed out in a hexadecimal form at high speed (step S18) before the flow proceeds to step S9. When the control command is not discriminated, however, the flow proceeds directly to step S9.

This embodiment has the following advantages. First, it is possible to control the initialization or rewriting of data in the EEPROM 5, in response to a control command sent from the host machine, without involving a troublesome switching or other operations that have been needed by the prior art. At that time, the entire areas of the EEPROM 5 can be rewritten collectively as indicated by step S15, which eliminates the need for preparing many control commands and their sequential discrimination, thus shortening the time required for the control. Further, since control commands, signals, etc. which have been used conventionally, can be used directly, the number of switches provided on the printer can be reduced significantly (no switches may be necessary in some case), thus contributing to the reduction of the cost. In the case where the contents of the EEPROM 5 are initialized or rewritten and the printer initialization is carried out with the new contents, unlike in the prior art, it is unnecessary to power off and then on the printer, or reset the host machine. Printer initialization is automatically accomplished by executing the control command "ESC @." The printing of the contents of the EEPROM 5 does not involve any troublesome operation and is easily done by executing the control command "ESC M R." The initial values of the EEPROM 5 are stored in the ROM 3 as a factory default so that if the data in the EEPROM 5 is rewritten by mistake, they will be restored by initializing the EEPROM 5. What is more, the restoring of the initial values can easily be accomplished by executing the control command "ESC M @."

Figure 5A:
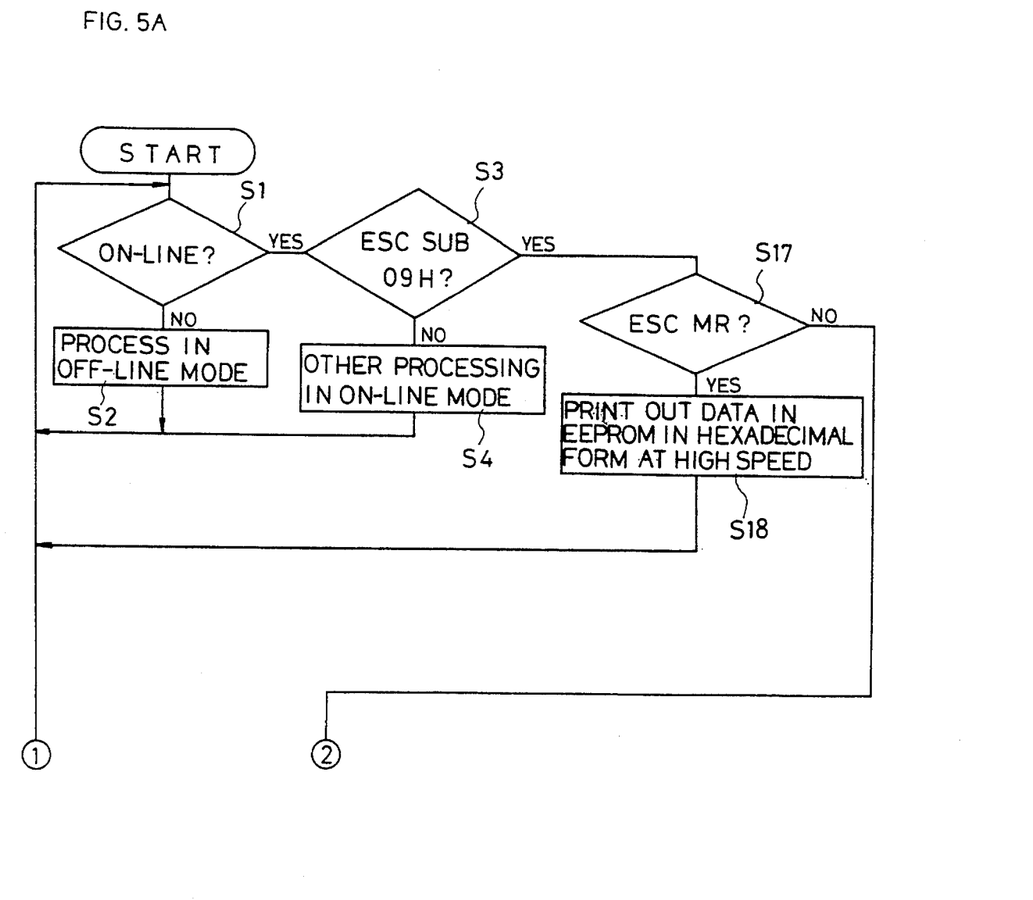
FIG. 5A and FIG. 5B are a flowchart for explaining the operation of a second embodiment of this invention.
Figure 5B:
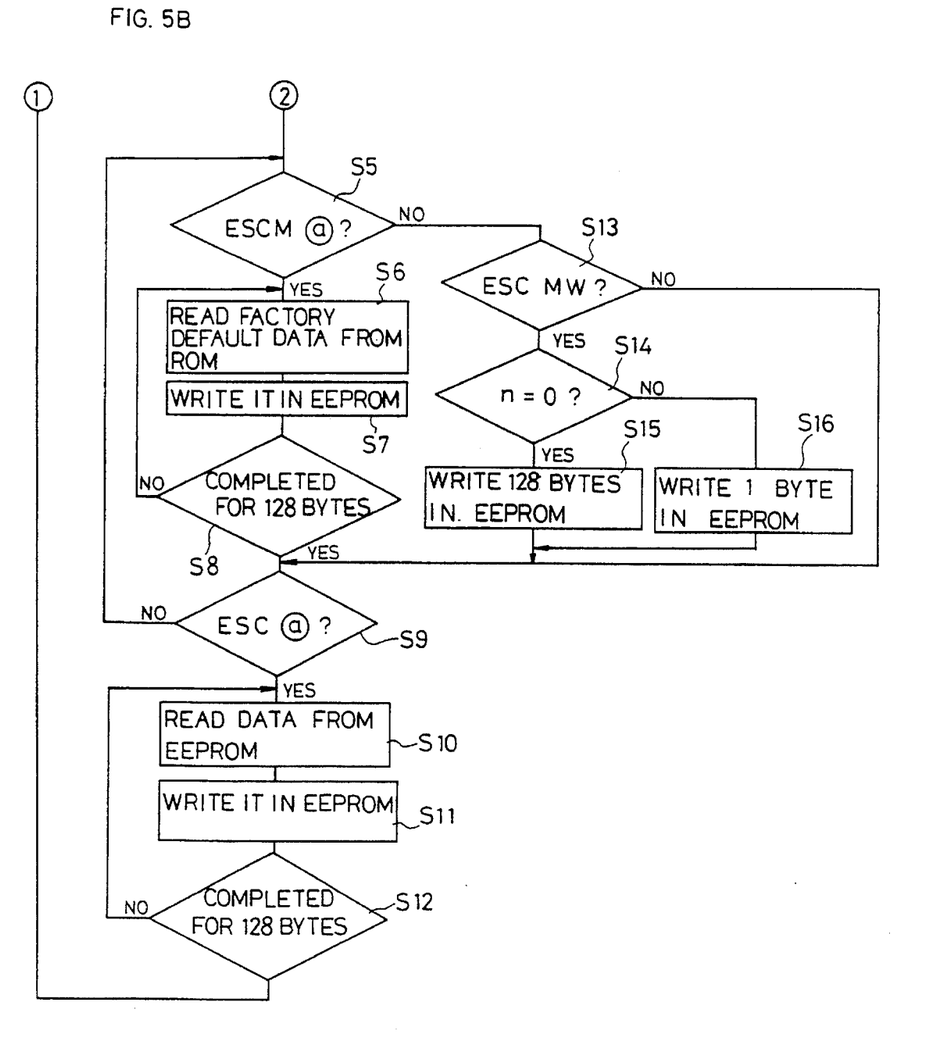

A second embodiment of this invention will now be described referring to FIG. 5A and FIG. 5B. In the first embodiment, the printing of the contents of the EEPROM 5 is performed on the premise that the printer has entered the EEPROM control mode and discriminated the commands relating to initialization or rewriting of the data in the EEPROM 5. This invention is not however limited to this design. When step S3 in FIG. 5A discriminates the control command "ESC SUB 09H" to enter the EEPROM control mode, the flow proceeds to step S17 to discriminate the control command "ESC M R" which starts high-speed printing of the data in the EEPROM 5 in a hexadecimal form. When the control command "ESC M R" is discriminated, the data in the EEPROM 5 is printed out in a hexadecimal form at a high speed (step S18) and the flow then returns to step S1. When the control command is not discriminated, however, the flow proceeds directly to step S5. In other words, after the printer enters the EEPROM control mode, it may discriminate first the command for printing the contents of the EEPROM 5. Further, the structure may be modified so that the contents of the EEPROM 5 are printed out in normal control mode without entering the EEPROM control mode.

The present invention is not limited to the above two embodiments, but may be modified in various other manners within the scope and spirit of this invention. For example, control commands shown in FIG. 2 may be realized by using other codes. The flowcharts given in FIGS. 3 and 5 are to be considered as illustrative and not restrictive, and may of course be modified as needed.

What is claimed is:

1. A printer comprising:

non-volatile memory data initialization/rewrite command discriminating means for discriminating a control command relating to initialization or rewriting of data in a non-volatile memory from other commands sent from a host machine;

non-volatile memory data initializing/rewriting means for directly initializing or rewriting said data in said non-volatile memory when said non-volatile memory data initialization/rewrite command discriminating means has discriminated said control command relating to initialization or rewriting of said data in said non-volatile memory;

printer initialization command discriminating means for discriminating a control command relating to initialization of said printer from other commands sent from said host machine; and printer initializing means for performing direct printer initialization based on initialized or rewritten data in said non-volatile memory when said printer initialization command discriminating means has discriminated said control command relating to initialization of said printer, said direct printer initialization being performed without any intermediate switching operation in the printer and the host machine.

2. The printer as claimed in claim 1, wherein said printer initialization command discriminating means discriminates said control command relating to initialization of said printer, after data initialization or rewriting is executed by said non-volatile memory data initializing/rewriting means.

3. The printer as claimed in claim 1, wherein said non-volatile memory data initializing/rewriting means partially or collectively rewrites said data in said non-volatile memory.

4. The printer as claimed in claim 1, wherein said non-volatile memory data initialization/rewrite command discriminating means and said non-volatile memory data initializing/rewriting means discriminate said control command relating to initialization of said data in said non-volatile memory and selectively perform predetermined initialization, and discriminate said control command relating to rewriting of said data in said non-volatile memory and selectively perform specified rewriting.

5. The printer as claimed in claim 1, wherein said printer automatically returns to a state immediately after power on after printer initialization by said printer initializing means is completed.

6. The printer according to claim 1, wherein said direct printer initialization is performed without any one of said printer being powered off-and-on and said host machine being reset.

7. The printer according to claim 1, wherein said direct printer initialization is performed devoid of a switching operation of said printer and said host machine.

8. The printer according to claim 1, wherein said direct printer initialization is performed without said printer being powered off-and-on.

9. The printer according to claim 1, wherein said direct printer initialization is performed without said host machine being reset.

10. A printer according to claim 1, wherein there is a control command to enter a non-volatile memory control mode, and said non-volatile memory data initialization/rewriting means enters said non-volatile memory control mode upon reception of said control command.

11. A printer according to claim 1, wherein there is a control command to leave a non-volatile memory control mode, and upon reception of said control command, said non-volatile memory data initialization/rewriting means leaves said non-volatile memory control mode and initializes said printer in accordance with new contents of said non-volatile memory.

* * * * *